(12) United States Patent
Buchanan et al.

(10) Patent No.: US 9,354,080 B2
(45) Date of Patent: May 31, 2016

(54) METHOD AND DEVICES FOR TEMPERATURE-BASED DETERMINATION OF GYROSCOPE BIAS

(75) Inventors: Nathan Daniel Pozniak Buchanan, Waterloo (CA); Robert George Oliver, Waterloo (CA); Christopher James Grant, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 906 days.

(21) Appl. No.: 13/592,472

(22) Filed: Aug. 23, 2012

(65) Prior Publication Data

US 2014/0058685 A1    Feb. 27, 2014

(51) Int. Cl.
| | | |
|---|---|---|
| *G01B 3/00* | (2006.01) | |
| *G01C 25/00* | (2006.01) | |
| *G01C 19/00* | (2013.01) | |
| *G01C 23/00* | (2006.01) | |
| *G01C 19/02* | (2006.01) | |

(52) U.S. Cl.
CPC .............. *G01C 25/005* (2013.01); *G01C 19/00* (2013.01); *G01C 19/02* (2013.01); *G01C 23/005* (2013.01)

(58) Field of Classification Search
CPC ....... G01C 19/02; G01C 19/00; G01C 23/005
USPC ........................................................... 702/33
See application file for complete search history.

(56) References Cited

U.S. PATENT DOCUMENTS

| | | | | |
|---|---|---|---|---|
| 5,337,141 | A * | 8/1994 | Egli et al. ....................... | 356/459 |
| 5,527,003 | A * | 6/1996 | Diesel et al. ................... | 244/195 |
| 5,570,304 | A * | 10/1996 | Mark et al. ....................... | 703/7 |
| 7,801,694 | B1 * | 9/2010 | Watson .......................... | 702/104 |
| 7,912,664 | B2 * | 3/2011 | Rozelle ......................... | 702/104 |
| 2011/0178707 | A1 * | 7/2011 | Sachs et al. .................... | 701/216 |
| 2012/0323520 | A1 * | 12/2012 | Keal .............................. | 702/141 |

OTHER PUBLICATIONS

CIPO, CA Office Action relating to Application No. 2,787,976, dated Apr. 15, 2015.
EPO, Extended European Search Report relating to application No. 12181478.4 dated Dec. 21, 2012.

* cited by examiner

*Primary Examiner* — John Breene
*Assistant Examiner* — Eyob Hagos
(74) *Attorney, Agent, or Firm* — Rowand LLP

(57) ABSTRACT

In one aspect, the present disclosure provides a processor-implemented method of determining a bias for an axis of a gyroscope. The method includes: obtaining a temperature reading; maintaining a plurality of bias estimators for the axis, each bias estimator associated with a temperature and configured to estimate a bias at the associated temperature, the plurality of bias estimators including a number of short term bias estimators for estimating biases for recently obtained temperatures and a number of long term bias estimators for estimating biases for temperatures obtained over a comparatively longer period of time; and determining a bias for the axis of the gyroscope based on the temperature reading and one or more of the bias estimators.

22 Claims, 7 Drawing Sheets

METHOD AND DEVICES FOR TEMPERATURE-BASED DETERMINATION OF GYROSCOPE BIAS

FIELD

The present disclosure relates generally to gyroscopes, and more particularly, to methods and devices for determining a bias for a gyroscope based on a temperature.

BACKGROUND

A gyroscope is a device for measuring rotation. Gyroscopes are sometimes included in electronic devices, such as handheld electronic devices, in order to provide information about the orientation of such electronic devices. Such orientation information allows the electronic device to know information about its own physical position. The gyroscope may allow for recognition of movement within a three dimensional space. The electronic device may use such orientation information as an input signal. That is, the electronic device may be operated in a mode in which gyroscope readings affect the operation of the electronic device.

Even when a gyroscope is not rotating, the gyroscope may have a signal output. The output, when the gyroscope is not rotating, is referred to as the bias or the bias error. Each sensing axis of the gyroscope may have a different bias. The bias may not be a fixed amount. That is, the bias may vary over time. Such variations may, for example, be caused by changes to the temperature of the electronic device or changes to the operating state of the electronic device. For example, the bias may be affected when the electronic device switches from an off state to an on state.

If the amount of the bias is known, the electronic device may account for the bias when using the gyroscope.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION OF EXAMPLE EMBODIMENTS

Figure 1:
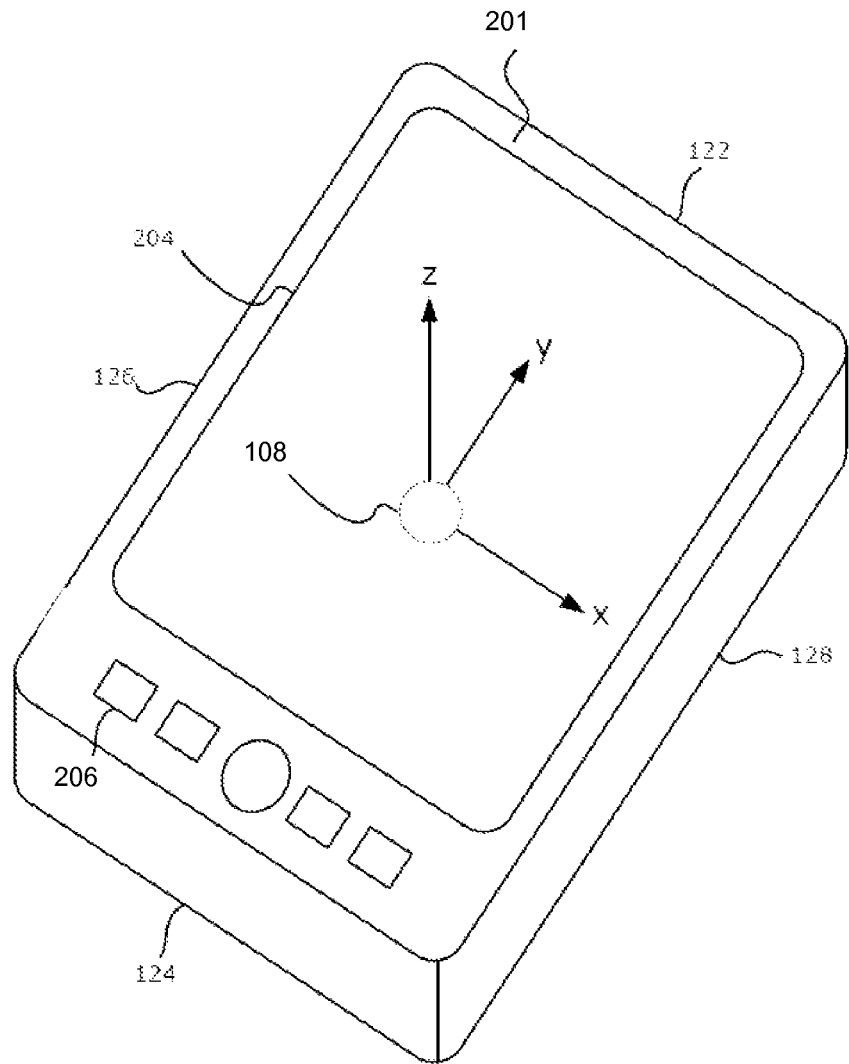
FIG. 1 is a front view of an electronic device having a three-axis gyroscope in accordance with example embodiments of the present disclosure.

In one aspect, the present disclosure provides a processor-implemented method of determining a bias for an axis of a gyroscope. The method includes: obtaining a temperature reading; maintaining a plurality of bias estimators for the axis, each bias estimator associated with a temperature and configured to estimate a bias at the associated temperature, the plurality of bias estimators including a number of short term bias estimators for estimating biases for recently obtained temperatures and a number of long term bias estimators for estimating biases for temperatures obtained over a comparatively longer period of time; and determining a bias for the axis of the gyroscope based on the temperature reading and one or more of the bias estimators.

In another aspect, the present disclosure provides an electronic device. The electronic device is configured for determining a bias for an axis of a gyroscope. The electronic device includes a memory for storing a plurality of bias estimators for the axis. Each bias estimator has a temperature associated therewith. Each bias estimator is configured to estimate a bias at the associated temperature. The plurality of bias estimators include a number of short term bias estimators for estimating biases for recently obtained temperatures and a number of long term bias estimators reserved for estimating biases for temperatures obtained over a comparatively longer period of time. The electronic device also includes the gyroscope and a temperature sensor. The electronic device also includes a processor coupled to the memory and the gyroscope and the temperature sensor. The processor is configured to: obtain a temperature reading; maintain the plurality of bias estimators for the axis; and determine a bias for the axis of the gyroscope based on the temperature reading and one or more of the bias estimators.

In another aspect, the present disclosure describes a computer readable storage medium. The computer readable storage medium includes computer-executable instructions for determining a bias for an axis of a gyroscope. The computer-executable instructions include: instructions for obtaining a temperature reading; instructions for maintaining a plurality of bias estimators for the axis, each bias estimator associated with a temperature and configured to estimate a bias at the associated temperature, the plurality of bias estimators including a number of short term bias estimators for estimating biases for recently obtained temperatures and a number of long term bias estimators for estimating biases for temperatures obtained over a comparatively longer period of time; and instructions for determining a bias for the axis of the gyroscope based on the temperature reading and one or more of the bias estimators.

Other aspects of the present disclosure will be described below.

Example Electronic Device

Gyroscope readings may suffer from a bias. Bias (or bias error) is the difference between the ideal output (which is zero) when the gyroscope is not rotating and the actual output when the gyroscope is not rotating. That is, the bias is the gyroscope output when the electronic device is not rotating. If the bias is unknown to an electronic device interpreting the gyroscope output, then the electronic device may erroneously interpret the gyroscope output. For example, the electronic device may believe that the gyroscope output represents a rotation, when the gyroscope is, in fact, not rotating.

When the electronic device which is interpreting the gyroscope output knows the bias, then the electronic device can account for the bias when interpreting the gyroscope output. That is, when the electronic device knows the amount of the bias, the electronic device can effectively cancel out the effect of the bias to ensure that the gyroscope output is correctly correlated to rotation of the gyroscope.

The bias for a gyroscope may be different for each sensing axis of the gyroscope. Accordingly, the bias may be determined separately for each sensing axis of the gyroscope and the electronic device which interprets the gyroscope output may cancel the effect of bias on a per-axis basis. Methods and electronic devices for determining the bias of a gyroscope will be discussed below.

The bias for a gyroscope may vary based on temperature conditions. That is, the temperature in the operating environment in which the gyroscope operates may affect the bias of that gyroscope. Accordingly, in at least some embodiments described below, the bias for a gyroscope may be determined in a manner that is temperature dependent.

Referring first to FIG. 1, a gyroscope 108 is shown located within an electronic device 201. The electronic device 201 may take many forms. By way of example, the electronic device may be a global positioning system (GPS) unit, an inertial navigation system (INS), a mobile communication device such as a mobile phone or smartphone, a tablet computer, a laptop computer, a wearable computer such as a watch, a camera, or an electronic device of another type.

The electronic device 201 may be any electronic device which makes use of one or more gyroscopes 108. In some embodiments, the electronic device 201 includes a display 204, such as a liquid crystal display (LCD), and an input interface 206, such as a keyboard or keypad or a navigation tool such as a clickable scroll wheel (also referred to as a track wheel or thumbwheel) or trackball. In some embodiments, the display 204 may be a touchscreen display which permits a user to provide input to the electronic device 201 by touching the display 204. That is, the display 204 may act as an input interface 206.

The gyroscope 108 measures rotational velocity of the gyroscope 108. In the embodiment illustrated, since the gyroscope 108 is integrated within the electronic device 201, the gyroscope 108 effectively measures rotational velocity of the electronic device 201.

The gyroscope 108 includes one or more sensing axis. In the embodiment illustrated, the gyroscope 108 includes three orthogonal primary sensing axes denoted x, y and z. Each sensing axis is orthogonal to the other sensing axes. For example, the x sensing axis is orthogonal to the y and z sensing axes, the y sensing axis is orthogonal to the x and z sensing axes and the z sensing axis is orthogonal to the x and y sensing axes.

The gyroscope 108 may produce a gyroscope reading for each of the sensing axes. For example, a gyroscope reading $w_x$ may be produced by the gyroscope based on gyroscope readings associated with the x sensing axis (such as a rotation about the x sensing axis), a gyroscope reading $w_y$ may be produced by the gyroscope based on gyroscope readings associated with the y sensing axis (such as a rotation about the y sensing axis), and a gyroscope reading $w_z$ may be produced by the gyroscope based on gyroscope readings associated with the z sensing axis (such as a rotation about the z sensing axis). These gyroscope readings collectively form the gyroscope output. That is, the gyroscope output is an electronic signal which is representative of the gyroscope readings $w_x$, $w_y$, $w_z$ for the sensing axes x, y, z of the gyroscope 108. The electronic signal may, for example, provide the gyroscope readings $w_x$, $w_y$, $w_z$ for the sensing axes x, y, z of the gyroscope 108 as measures of an amount of rotation per unit time about each sensing axis. For example, the gyroscope 108 may produce an output in terms of radians per second or degrees per second. The gyroscope output may, in some embodiments, be an analog output. In other embodiments, the gyroscope output may be digital. A gyroscope reading captured at a point in time may be referred to as a gyroscope sample or a gyroscope reading. Such samples may be obtained, for example, at regular intervals.

The gyroscope output may separate the gyroscope readings for each sensing axis at a signal level or at an output interface level, or both. For example, in some embodiments, the gyroscope 108 may have a separate output interface (such as a separate pad or pin) associated with each sensing axis. Each output interface associated with a sensing axis may provide an output signal representing gyroscope readings for its associated sensing axis (thus separating the gyroscope readings for the sensing axes at an output interface level). In other example embodiments, a common output interface (such as a common pad or pin) may be associated with a plurality of sensing axes. That is, gyroscope readings for a plurality of sensing axes may be provided on a common output interface (such as a common pad or pin).

In some embodiments, the gyroscope 108 may be a digital gyroscope provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

As shown in FIG. 1, the sensing axes x, y, z may be aligned with the form factor of the electronic device 201. In some embodiments, the x sensing axis is aligned along an axis extending along the midpoint of the electronic device 201 between left and right sides 126, 128 of the electronic device 201, the y sensing axis is aligned along an axis extending along the midpoint of the electronic device 201 between top and bottom ends 122, 124, and the z sensing axis extends perpendicularly through the x-y plane defined by the x and y sensing axes at the intersection (origin) of these axes. In this way, when the electronic device 201 is oriented on a flat surface, such as a table, the x and y sensing axes are parallel to the table and the z sensing axis is perpendicular to the table. It is contemplated that the sensing axes x, y, z may be aligned with different features of the electronic device 201 in other embodiments.

Figure 2:
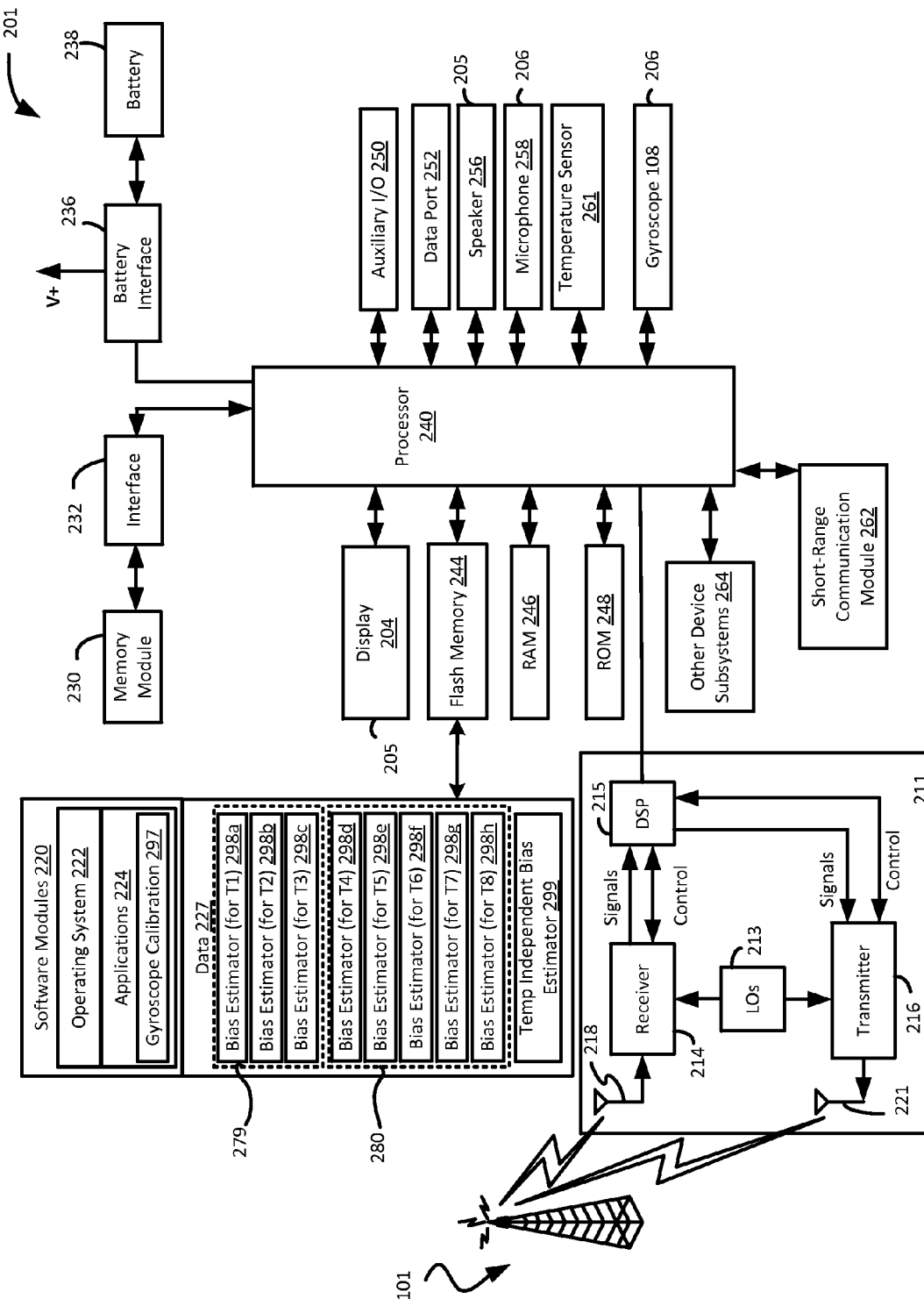
FIG. 2 is a block diagram of example components of an electronic device having a gyroscope in accordance with example embodiments of the present disclosure.

Referring now to FIG. 2, a block diagram of an example electronic device 201 is illustrated. The electronic device 201 of FIG. 2 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras, a gyroscope 108, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces), a temperature sensor 261, a short range communication module 262, and other device subsystems generally designated as 264. Some of the subsystems shown in FIG. 2 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216, as is known in the art. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection.

The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, images, and other commonly stored user information stored on the electronic device 201 by its user, and other data.

The data 227 may, in at least some embodiments, include one or more bias estimators 298a, 298b, 298c, 298d, 298e, 298f, 298g, 298h, 299. The bias estimators represent gyroscope readings from which a bias may be determined. More specifically, at least some of the bias estimators may be temperature-associated bias estimators. That is, at least some of the bias estimators are associated with a temperature. In the embodiment illustrated, there are eight temperature-associated bias estimators—a first bias estimator 298a (which is associated with a temperature T1), a second bias estimator 298b (which is associated with a temperature T2), a third bias estimator 298c (which is associated with a temperature T3), a fourth bias estimator 298d (which is associated with a temperature T4), a fifth bias estimator 298e (which is associated with a temperature T5), a sixth bias estimator 298f (which is associated with a temperature T6), a seventh bias estimator 298g (which is associated with a temperature T7), an eighth bias estimator 298h (which is associated with a temperature T8).

Each bias estimator represents or may be used to determine a bias for an axis of the gyroscope 108. The bias estimators may include or represent gyroscope readings. Each temperature-associated bias estimator 298a, 298b, 298c, 298d, 298e, 298f, 298g, 298h represents or may be used to estimate the gyroscope bias at an associated temperature (or a narrow range of temperatures e.g. a one degree range). By way of example, in at least some embodiments, each temperature-associated bias estimator may include a plurality of gyroscope readings obtained at a temperature associated with that bias estimator (e.g. obtained when the temperature sensor indicated that temperature). For example, the first bias estimator 298a may include a plurality of gyroscope readings obtained at a first temperature T1. Similarly, the second bias estimator 298b may include a plurality of gyroscope readings obtained at the second temperature T2. The third bias estimator 298c may include a plurality of gyroscope readings obtained at the third temperature T3. The fourth bias estimator 298d may include a plurality of gyroscope readings obtained at the fourth temperature T4. The fifth bias estimator 298e may include a plurality of gyroscope readings obtained at the fifth temperature T5. The sixth bias estimator 298f may include a plurality of gyroscope readings obtained at the sixth temperature T6. The seventh bias estimator 298g may include a plurality of gyroscope readings obtained at the seventh temperature T7. The eighth bias estimator 298h may include a plurality of gyroscope readings obtained at the eighth temperature T8. That is, the temperature-associated bias estimators 298a, 298b, 298c, 298d, 298e, 298f, 298g, 298h contain temperature tagged gyroscope readings.

As will be described in greater detail below, the gyroscope readings included in a bias estimator allow a bias to be determined by the electronic device 201 for that bias estimator. Where the bias estimator is a temperature-associated bias estimator 298a, 298b, 298c, 298d, 298e, 298f, 298g, 298h (i.e. where it is a bias estimator that is associated with a specific temperature), the bias estimator allows a bias to be determined for the specific temperature.

The bias estimators 298a, 298b, 298c, 298d, 298e, 298f, 298g, 298h include a predetermined number of short term bias estimators 279. In the example illustrated, the first bias estimator 298a, second bias estimator 298b and third bias estimator 298c are short term bias estimators 279. Accordingly, in the example illustrated, the bias estimators include three short term bias estimators 279. The short term bias estimators 279 are reserved for estimating biases for recent temperatures. That is, the short term bias estimators 279 are reserved for estimating biases for temperatures that were observed recently at or near the electronic device 201. A short term bias estimator 279 may be used to determine the bias at an associated temperature which was recently observed by the temperature sensor.

In at least some embodiments, the short term bias estimators 279 are stored in a least recently used (LRU) cache. A least recently used (LRU) cache is a short-term storage which values elements contained in the cache based on the elapsed period of time since the elements were accessed. That is, the least recently used (LRU) cache is configured to remove bias estimators from inclusion among the short term bias estimators 279 based on how recently a temperature associated with the bias estimator was observed. In order to free up space to create a bias estimator for newly observed temperatures (i.e. temperatures that are observed using the temperature sensor 261 and that do not have an existing bias estimator associated therewith), the LRU cache may remove the least recently used short term bias estimator 279. That is, the short term bias estimator 279 whose associated temperature was observed least recently may be removed from inclusion as a short term bias estimator 279 to make room for a new short term bias estimator 279. As will be described in greater detail below, when this short term bias estimator 279 is removed, it may either be deleted from memory or may be stored as a long term bias estimator.

The electronic device 201 also includes a predetermined number of long term bias estimators 280. A long term bias estimator 280 is a bias estimator that is reserved for estimating biases for temperatures observed over a comparatively longer period of time. That is, the long term bias estimator 280 is used for estimating biases for temperatures that have been observed in the past, but which may not have been observed recently. A long term bias estimator may store data that can be used to calculate a bias for the gyroscope at an associated temperature. For example, a long term bias estimator 280 may store gyroscope readings all obtained at the same temperature (or within a narrow range of that temperature). As will be described in greater detail below, a bias may be determined from such measurements (e.g. using an adaptive histogram of the type described below).

Long term bias estimators 280 may help to protect the range of temperatures that an accurate bias may be calculated for. More specifically, the long term bias estimators 280 help to ensure that data that may be used to determine a gyroscope is stored for a wide range of temperatures. For example, when a user is travelling outside in cold weather, the short term bias estimators 279 may become populated with data that may be used to determine a bias in cold weather. However, when they move inside into warmer weather, the short term bias estimators 279 may not, initially, include data from which a bias may be calculated in the warmer temperatures. In this scenario the long term bias estimators 280 may include data for warmer temperatures and may be used to calculate a bias. Thus, the long term bias estimators 280 help to ensure that the temperature bias model that is developed by the electronic device 201 based on the bias estimators is valid over a wide range of temperatures.

As will be described in greater detail below, in order to allow the long term bias estimators 280 to operate over a wide range of temperatures, the long term bias estimators 280 may be managed by the electronic device 201 to represent a wide range of temperatures. For example, to ensure that the long term bias estimators 280 represent a wide range of temperatures and/or a diverse set of temperatures, one or more of the long term bias estimators 280 may be protected from deletion or replacement. That is, the electronic device 201 may prevent one or more of the long term bias estimators 280 from being replaced.

Accordingly, the electronic device 201 manages a predetermined number of long term bias estimators 280. In the example illustrated, five long term bias estimators 280 (these are labelled as 298d, 298e, 298f, 298g, 298h) are included, each associated with a different temperature (these temperatures are labelled as T4, T5, T6, T7, T8). The temperatures T4, T5, T6, T7, T8 of the long term bias estimators 280 differ from the temperatures T1, T2, T3 of the short term bias estimators 279.

In at least some embodiments, the data 227 may also include a temperature independent bias estimator 299. The temperature independent bias estimator 299 is not associated with a specific temperature. Rather, the temperature independent bias estimator 299 may be used for determining a bias over all temperatures. The temperature independent bias estimator 299 may also be referred to as an aggregate bias estimator, since it may be used to determine an estimate of a bias for a gyroscope 108 irrespective of temperature. That is, the temperature independent bias estimator 299 provides a bias estimate for the gyroscope across all temperatures.

The temperature independent bias estimator 299 stores data that may be used to determine a bias for the gyroscope 108. For example, the temperature independent bias estimator 299 may store a plurality of gyroscope readings. As will be described in greater detail below, a bias may be determined from such measurements (e.g. using an adaptive histogram of the type described below).

In at least some embodiments, the temperature independent bias estimator 299 may be used by the electronic device 201 for determining a bias when the bias estimators 298a, 298b, 298c, 298d, 298e, 298f, 298g, 298h associated with temperatures are not stable. For example, the temperature independent bias estimator 299 may be used when the bias estimators that are associated with temperatures (such as the long term bias estimators and the short term bias estimators) do not yet contain enough data to be reliable (e.g. when they do not contain enough gyroscope readings to be reliable).

Each of the bias estimators 298a, 298b, 298c, 298d, 298e, 298f, 298g, 298h, 299 in the example embodiment illustrated, is associated with the same axis of a gyroscope 108. That is, a single axis of a gyroscope 108 may have the bias estimators described above associated with that axis. Since the bias may vary for each axis of a gyroscope, in embodiments in which the gyroscope 108 is a multi-axis gyroscope, each axis may have bias estimators of the type described above associated therewith and the methods for determining the bias for a gyroscope may be performed independently for each axis using the techniques described herein. The determination of a bias for an axis may be performed using the bias estimators associated with that axis (and not the bias estimators associated with other axes).

In at least some embodiments, the bias estimators may be configured to rely on a histogram to determine a bias measurement. In at least some such embodiments, each bias estimator may include a histogram. The histogram is a representation of past gyroscope readings for a sensing axis. For a bias estimator $298a$, $298b$, $298c$, $298d$, $298e$, $298f$, $298g$, $298h$ that is associated with a temperature, the histogram for that bias estimator represents past gyroscope readings obtained at that temperature. That is, for a bias estimator associated with a temperature, T, the histogram is obtained based on gyroscope readings obtained when the temperature sensor 261 indicated the temperature, T.

As will be described in greater detail below with reference to FIGS. 4 to 7, the histograms may be created, maintained, and/or used by a software application or module, such as a gyroscope calibration application 297.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing.

The electronic device 201 also includes or is connectable to a power source, such as a battery 238. The battery 238 may be one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short range communication module 262 provides for communication between the electronic device 201 and different systems or devices, which need not necessarily be similar devices. For example, the short range communication module 262 may include an infrared device and associated circuits and components, or a wireless bus protocol compliant communication mechanism such as a Bluetooth® communication module to provide for communication with similarly-enabled systems and devices.

The electronic device 201 includes a gyroscope 108 which is configured to sense rotation of the electronic device 201. The gyroscope 108 may, in at least some embodiments, be a three-axis gyroscope of the type described above with reference to FIG. 1.

The electronic device 201 includes a temperature sensor 261. The temperature sensor 261 is an electronic temperature sensor which is configured to produce an electronic signal in dependence on an observed temperature. This electronic signal may be referred to as a temperature reading or a temperature measurement. The temperature sensor 261 may be an analog temperature sensor or a digital temperature sensor. While the temperature sensor 261 is illustrated as a separate component, in some embodiments, the temperature sensor 261 may be embedded with another component such as, for example, the gyroscope 108.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short range communication module 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory; for example, in the flash memory 244. As illustrated in FIG. 2, the software modules 220 may include operating system software 222 and one or more additional applications 224 or modules such as, for example, a gyroscope calibration application 297.

In the example embodiment of FIG. 2, the gyroscope calibration application 297 is illustrated as being implemented as a stand-alone application 224. However, in other example embodiments, the gyroscope calibration application 297 could be provided by another application or module such as, for example, the operating system software 222. Furthermore, while the gyroscope calibration application 297 is illustrated with a single block, the functions or features provided by the gyroscope calibration application 297 could, in at least some embodiments, be divided up and implemented by a plurality of applications and/or modules.

Furthermore, while, in the example embodiment of FIG. 2, the gyroscope calibration application 297 is illustrated as being associated with the main processor 240 of the electronic device 201, in other embodiments, the gyroscope calibration application 297 could be associated with another processor, or group of processors. For example, in some embodiments, the gyroscope 108 may include or be connected to a secondary processor. The secondary processor may provide a narrow set of functions or features and may be used to offload some processing from the main processor 240. For example, in some embodiments, the secondary processor is a gyroscope-specific processor which is coupled to the gyroscope 108 and which is configured to provide gyroscope related functions such as those provided by the gyroscope calibration application 297. For example, the secondary processor may be configured to determine the bias of the gyroscope in the manner described herein and may, in at least some embodiments, be configured to correct for the bias. For example, the secondary processor may separate and remove the effect of the bias from gyroscope readings and may provide the resulting corrected gyroscope readings to the main processor 240 for further analysis and/or interpretation.

The gyroscope calibration application 297 may be configured to determine the bias for a gyroscope 108. Example methods of determining a bias for a gyroscope will be described in greater detail below.

The electronic device 201 may include a range of additional software applications 224, including, for example, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Temperature-Dependent Bias Determination

Figure 3:
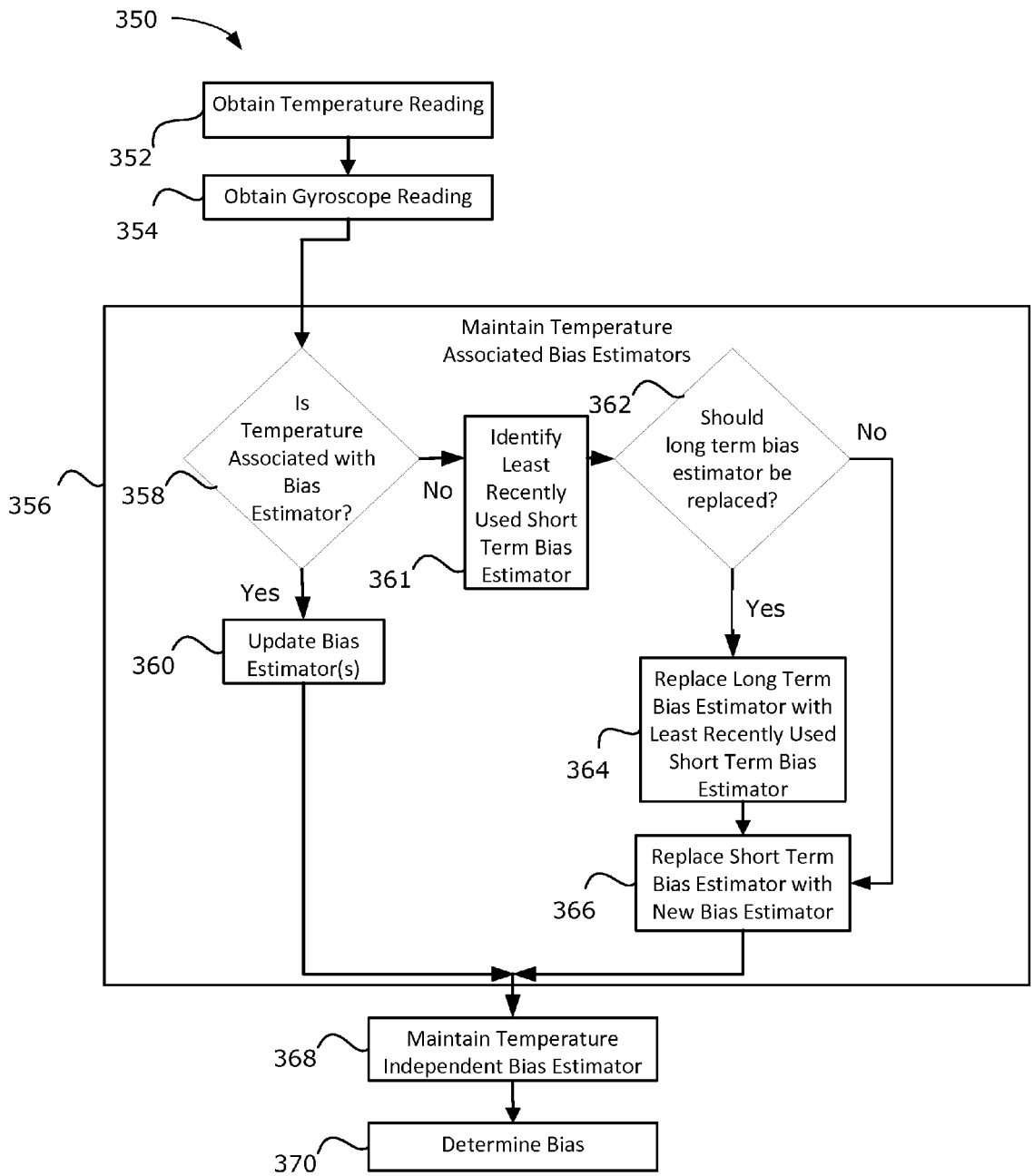
FIG. 3 is a flowchart of an example method for determining a bias for an axis of a gyroscope in accordance with example embodiments of the present disclosure.

As noted previously, gyroscope bias tends to vary based on temperature. Accordingly, in at least some embodiments, the determination of a bias for a gyroscope is dependent on the current temperature. Referring now to FIG. 3, an example method 350 for determining a bias for an axis of a gyroscope 108 is illustrated.

The method 350 may include features which may be provided by an electronic device 201, such as the electronic device 201 of FIGS. 1 and 2. For example, one or more applications or modules associated with an electronic device 201, such as the gyroscope calibration application 297 (FIG. 2), may contain processor readable instructions for causing a processor associated with the electronic device 201 to perform one or more operations of the method 350. That is, in at least some example embodiments, the electronic device 201 may be configured to perform the method 350. For example, the method 350 may be implemented by a processor 240 (FIG. 2) of an electronic device 201 (FIG. 2).

In at least some embodiments, one or more of the functions or features of the method 350 may be performed, in whole or in part, by another system, software application, module, component or device apart from those specifically listed above. For example, in some embodiments, the method 350 may be performed by a processor associated with the gyroscope 108. That is, in at least some embodiments, the method 350 or a portion thereof may be performed by a processor other than the main processor 240 the electronic device 201. A processor which is associated with the gyroscope 108 and which may be used for the specific purpose of controlling the gyroscope 108 (i.e. a gyroscope-specific processor) may be configured to perform the method 350 or a portion thereof.

At 352, a temperature reading is obtained. More particularly, a temperature reading is obtained by the electronic device 201 from the temperature sensor 261 (FIG. 2).

At 354, a gyroscope reading is obtained from the gyroscope 108. The gyroscope reading is obtained at or near the time when the temperature reading is obtained. In some embodiments, the gyroscope reading and the temperature reading are obtained simultaneously. Thus, the gyroscope reading is effectively a temperature-tagged reading. That is, the gyroscope reading is associated with a temperature.

At 356, the electronic device 201 maintains a plurality of bias estimators 298a, 298b, 298c, 298d, 298e, 298f, 298g, 298h (FIG. 2). More particularly, at 356, the electronic device may update one or more bias estimators 298a, 298b, 298c, 298d, 298e, 298f, 298g, 298h stored in memory of the electronic device 201 based on the gyroscope reading and the temperature reading. The bias estimators 298a, 298b, 298c, 298d, 298e, 298f, 298g, 298h that are maintained at 356 may each have a temperature associated therewith. Each bias estimator 298a, 298b, 298c, 298d, 298e, 298f, 298g, 298h that is associated with a temperature may be configured to estimate a bias at that temperature.

The plurality of bias estimators that are maintained at 356 include a predetermined number of short term bias estimators 279 (FIG. 2) that are reserved for estimating biases for recent temperatures and a predetermined number of long term bias estimators 280 (FIG. 2) reserved for estimating biases for temperatures observed over a comparatively longer period of time. The short term bias estimators 279 and long term bias estimators are described in greater detail in the discussion of FIG. 2 above.

In at least some embodiments, the temperature-tagged gyroscope reading obtained at 354 may be used to update a bias estimator 298a, 298b, 298c, 298d, 298e, 298f, 298g, 298h. That is, a bias estimator may be updated so that the newly obtained gyroscope reading may be used when calculating a bias for that bias estimator.

As will be explained in greater detail below, at 356, a short term bias estimator 279 may be updated based on the gyroscope reading or a long term bias estimator 280 may be updated based on the gyroscope reading.

In at least some embodiments, at 358, the electronic device may determine whether the temperature represented by the temperature reading obtained at 352 is associated with an existing bias estimator 298a, 298b, 298c, 298d, 298e, 298f, 298g, 298h. That is, the electronic device 201 may determine whether one of the short term bias estimators 279 or the long term bias estimators 280 are associated with that temperature.

If one of the existing bias estimators 298a, 298b, 298c, 298d, 298e, 298f, 298g, 298h is associated with that temperature, then at 360, the electronic device 201 may update the bias estimator associated with that temperature. More specifically, the electronic device 201 may update the bias estimator associated with that temperature to include or represent the gyroscope reading obtained at 354.

If, however, it is determined at 358 that the temperature represented by the temperature reading obtained at 352 is not associated with an existing bias estimator, then the electronic device 201 may create a new short term bias estimator 279 to be associated with that temperature.

To prevent the bias estimators from consuming too much memory, the number of bias estimators 298a, 298b, 298c, 298d, 298e, 298f, 298g, 298h that will be maintained (e.g. the number of bias estimators that will be permitted to exist in memory) may be predetermined. In at least some embodiments, the number of short term bias estimators 279 may be predetermined and the number of long term bias estimators 280 may also be predetermined. For example, as illustrated in FIG. 2, in some embodiments, three short term bias estimators 279 may be maintained and five long term bias estimators 280 may be maintained.

Thus, when the number of bias estimators that are being maintained by the electronic device 201 has reached the maximum that will be allowed, in order to create a new short term bias estimator 279, an existing short term bias estimator 279 is removed. That is, if it is determined that the temperature reading obtained at 352 defines a temperature that does not have a bias estimator 298a, 298b, 298c, 298d, 298e, 298f, 298g, 298h associated therewith, then one of the short term bias estimators 279 may be replaced with a new short term bias estimator 279. The new short term bias estimator 279 is associated with the temperature defined by the temperature reading obtained at 352.

The short term bias estimator 279 that will be removed to free up space for a new short term bias estimator 279 may be automatically selected by the electronic device 201. As noted previously, in at least some embodiments, the electronic device 201 is configured to value short term bias estimators 279 based on how recently those bias estimators have been accessed. That is, in at least some embodiments, the short term bias estimators 279 are stored in a least recently used cache. A least recently used (LRU) cache is a short-term storage which values elements contained in the cache based on the elapsed period of time since the elements were accessed. The least recently used (LRU) cache is configured to remove bias estimators from inclusion among the short term bias estimators 279 based on how recently a temperature associated with the bias estimator was observed. In order to free up space to create a bias estimator for newly observed temperatures (i.e. temperatures that are observed using the temperature sensor and that do not have an existing bias estimator associated therewith), the LRU cache may remove the least recently used short term bias estimator 279. That is, the short term bias estimator 279 whose associated temperature was observed least recently may be removed from inclusion as a short term bias estimator 279.

In embodiments in which the least recently used short term bias estimator is removed, at 361 the electronic device 201 may identify the least recently used short term bias estimator. The electronic device 201 may do so by identifying the short term bias estimator that is associated with a temperature that has not been observed recently. For example, the electronic device 201 may examine all of the temperatures associated with the short term bias estimators 279 and may determine which of those temperatures was observed least recently. The bias estimator associated with this temperature may be considered by the electronic device 201 to be the least recently used (LRU) short term bias estimator 279.

The identified least recently used short term bias estimator 279 may be the bias estimator that will be removed from inclusion among the short term bias estimators to free up space for a new short term bias estimator based on the temperature represented in the temperature reading obtained at 352.

However, in at least some embodiments, before removing a short term bias estimator 279 from memory, the electronic device 201 may determine, at 362, whether a long term bias estimator 280 should be replaced with the short term bias estimator 279 that is to be removed. That is, the electronic device 201 determines whether the short term bias estimator 279 that is to be removed will be re-designated as one of the long term bias estimators 280.

In at least some embodiments, at 362, the electronic device 201 may determine if the least recently used short term bias estimator contains too few samples to be considered for inclusion as a long term bias estimator. This determination may be made by comparing a number of gyroscope readings represented by the least recently used short term bias estimator to a predetermined threshold. The predetermined threshold may represent a minimum number of gyroscope readings that must be represented by a short term bias estimator for the short term bias estimator to be considered reliable enough for inclusion among the long term bias estimators.

If, based on the comparison, the electronic device 201 determines that the least recently used short term bias estimator contains too few samples (e.g. enough gyroscope readings) to be considered for inclusion as a long term bias estimator 280, then the electronic device 201 may determine that a long term bias estimator 280 should not be replaced with the short term bias estimator (i.e. it determines that the short term bias estimator 279 should not become a long term bias estimator) and the method 350 may proceed to 366 where the short term bias estimator 279 is replaced by discarding the least recently used short term bias estimator 279 and by also storing a new short term bias estimator 279 based on the gyroscope reading obtained at 364. The new short term bias estimator 279 is associated with the temperature represented by the temperature reading obtained at 362.

When the electronic device 201 determines that the least recently used short term bias estimator contains enough samples to be considered for inclusion as a long term estimator, it may then determine whether it would be better to keep all of the existing long term bias estimators rather or whether it would be better to replace one of the long term bias estimators with the least recently used short term bias estimator. To do so, at 362 the electronic device 201 may select one of the long term bias estimators 280 for possible replacement. As noted in the discussion of FIG. 2 above, the electronic device 201 may be configured to protect one or more of the long term bias estimators from replacement to ensure that the bias estimators maintained by the electronic device 201 represent bias estimators for a wide range of temperatures.

To ensure that the bias estimators represent a wide range of temperatures, in at least some embodiments, when selecting a long term bias estimator 280 for possible replacement, the electronic device 201 may identify the range of temperatures represented by the bias estimators. That is, the electronic device 201 may identify the minimum and maximum temperatures that are represented by the bias estimators (and/or may identify the maximum and minimum temperatures that have ever been observed at the temperature sensor 261). Based on the identified range of temperatures, the electronic device 201 may selectively protect one or more of the long term bias estimators 280 from replacement. For example, in at least some embodiments, the identified range of temperatures represented by the bias estimators 298*a*, 298*b*, 298*c*, 298*d*, 298*e*, 298*f*, 298*g*, 298*h* may be separated into a plurality of sub-ranges. These sub ranges may all be of the same size. That is, the difference between the maximum temperature and minimum temperature may be the same for each sub-range. By way of example, in at least some embodiments, the identified range of temperatures represented by the bias may be separated into three sub-ranges (e.g. the range of temperatures represented by the bias estimators may be separated into thirds). In at least some embodiments, the electronic device 201 may attempt to ensure that a long term bias estimator may be included in each sub-range.

For example, in some embodiments, for each sub-range that does not include the temperature associated with the short term bias estimator 279 that was identified as the least recently used short term bias estimator at 361, the electronic device 201 may protect, from replacement, one of the long term bias estimators 280 having a temperature included in that range. In each of these sub-ranges, the electronic device 201 may identify the long term bias estimator 280 representing the greatest number of gyroscope readings in that sub-range and may protect the identified long term bias estimator 280 from being replaced. This ensures that, even after replacement, each sub-range will have at least one bias estimator.

After the electronic device 201 selectively protects one or more of the long term bias estimators, it may identify the unprotected long term bias estimator representing the fewest gyroscope readings. This identified bias estimator is selected for possible replacement.

The electronic device 201 may then compare the number of gyroscope readings associated with the short term bias estimator 279 identified at 361 as the least recently used short term bias estimator with the number of gyroscope readings associated with the unprotected long term bias estimator identified as representing the fewest number of gyroscope readings. Based on this comparison, the electronic device 201 may determine whether the identified long term bias estimator 280 should be replaced. For example, if the least recently used short term bias estimator represents fewer gyroscope readings than the identified unprotected long term bias estimator, then the electronic device 201 may determine that no long term bias estimators 280 should be replaced. Conversely, if the least recently used short term bias estimator represents more gyroscope readings than the identified unprotected long term bias estimator, then the electronic device 201 may determine that the long term bias estimator that was identified for possible replacement should be replaced.

If the electronic device determines, at 362, that a long term bias estimator should be replaced, then at 364, the electronic device 201 may replace one of the long term bias estimators 280 with the least recently used short term bias estimator. The long term bias estimator that was identified for possible replacement may be discarded and, in its place, the least recently used short term bias estimator may be re-designated as a long term bias estimator.

Then, at 366, the short term bias estimator 279 may be replaced. That is, a new short term bias estimator may be stored based on the gyroscope reading obtained at 354. The new short term bias estimator is associated with the temperature defined by the temperature reading obtained at 352.

If, at 362, the electronic device 201 determines that the long term bias estimator should not be replaced, then 364 may not be performed. Instead, the method 350 may proceed directly to 366 where the least recently used short term bias estimator 279 is replaced with a new bias estimator. More particularly, the least recently used short term bias estimator may be discarded and a new short term bias estimator may be stored based on the gyroscope reading obtained at 354. The new short term bias estimator is associated with the temperature defined by the temperature reading obtained at 352.

In at least some embodiments (not illustrated), when maintaining the bias estimators, the electronic device 201 may be configured to periodically reduce the number of gyroscope readings represented by the long term bias estimators. For example, in at least some embodiments, the electronic device 201 may periodically reduce the number of gyroscope readings represented by the long term bias estimators by a predetermined factor (e.g. by a factor of two). Such periodic reductions may avoid an old outlier bias estimator from permanently affecting bias estimates.

As will be described in greater detail below, in at least some embodiments, each bias estimator may include a histogram which may be used for determining a bias associated with that bias estimator. As will be described in greater detail below, the histogram may represent the gyroscope readings associated with the bias estimator (i.e. the histogram represents the gyroscope readings at the temperature associated with that bias estimator).

In some embodiments, the electronic device 201 may be configured to maintain a temperature independent bias estimator 299 (at 368). The temperature independent bias estimator 299 is a bias estimator that is configured for providing a bias estimate across all temperatures. That is, the temperature independent bias estimator 299 is composed of gyroscope readings irrespective of the temperature associated with such readings. Accordingly, at 368, the gyroscope reading obtained at 354 may be added to the temperature independent bias estimator 299.

The temperature independent bias estimator 299 may, for example, be used for determining the bias of a gyroscope when the bias estimators that are associated with temperatures (i.e. the bias estimators maintained at 356) are not yet stable.

At 370, the electronic device 201 may determine the bias for the gyroscope based on the temperature reading obtained at 352 and based on one or more of the bias estimators maintained by the electronic device 201.

As noted previously, in at least some instances, the bias estimators that are associated with temperatures (i.e. the bias estimators maintained at 356) may not yet be reliable. For example, when the electronic device 201 is first powered on, the bias estimators 298*a*, 298*b*, 298*c*, 298*d*, 298*e*, 298*f*, 298*g*, 298*h* that are associated with temperatures may not yet contain enough data to be reliable. Since the temperature independent bias estimator (i.e. the bias estimator maintained at 368) is constructed using gyroscope readings irrespective of temperature, this bias estimator may be quicker to stabilize. Accordingly, in at least some embodiments, the electronic device 201 may determine whether the bias estimators that are associated with temperatures are reliable (e.g. whether they contain sufficient data) and, if they are not reliable, may use the temperature independent bias estimator 299 to determine the bias for the gyroscope 108.

The determination of a bias using the temperature independent bias estimators may, for example, be performed according to a method described below with reference to FIG. 4. For example, a plurality of gyroscope readings may be represented as a histogram 800 (an example of which is illustrated in FIG. 5). The histogram 800 for the temperature independent bias estimator 299 may represent gyroscope readings irrespective of temperature. That is, the histogram may be constructed based on gyroscope readings without regard to the temperature indicated by the temperature sensor 261 at the time such readings were obtained. Using the histogram 800, a bias may be determined.

After the bias estimators 298a, 298b, 298c, 298d, 298e, 298f, 298g, 298h associated with temperatures become reliable, then these bias estimators may be used to determine a bias for the gyroscope 108 based on the temperature reading obtained at 352.

If the temperature reading obtained at 352 represents a temperature that does not have a bias estimator 298a, 298b, 298c, 298d, 298e, 298f, 298g, 298h associated therewith (apart from a possible newly created short term bias estimator which may have been created at 366 but which would not yet have sufficient data to be useful), a least squares fit may be performed to model the relationship between temperature and bias. For example, a least squares fit may be performed on the long term bias estimators 280 and, in some embodiments, on one or more of the short term bias estimators 279 (e.g. short term bias estimators 279 may be used if they contain enough gyroscope readings to be considered reliable).

To perform a least squares fit, a bias may be determined for each of these bias estimators. The bias for each bias estimator may be determined according to a method described below with reference to FIG. 4. For example, a plurality of gyroscope readings may be represented as a histogram (an example of which is illustrated in FIG. 5). Since the long term bias estimators 280 and the short term bias estimators 279 are associated with temperatures, each bias estimator provides a bias at a specific temperature. By modeling the relationship between the bias and temperature, a bias may be determined based on temperatures that are not directly associated with a bias estimator. Accordingly, when the bias estimators (apart from a possible newly created short term bias estimator, which will not be considered) are not associated with the temperature represented by the temperature reading obtained at 352, then the bias may be determined by performing a least squares fit using a plurality of bias estimators (i.e. by first determining the bias represented by those bias estimators) and the temperatures associated with those bias estimators.

In some embodiments, when one of the bias estimators 298a, 298b, 298c, 298d, 298e, 298f, 298g, 298h (other than a possible new short term bias estimator created at 366) is associated with the temperature represented by the temperature reading obtained at 352, then that bias estimator may be used to determine the bias of the gyroscope 108 at the current temperature (i.e. the other bias estimators may not be used and the bias may be determined directly from the bias estimator associated with the current temperature).

In at least some embodiments, when one of the bias estimators 298a, 298b, 298c, 298d, 298e, 298f, 298g, 298h is associated with the temperature represented by the temperature reading obtained at 352, then the electronic device may evaluate the stability of that bias estimator and may use that bias estimator directly for determining the bias only if that bias estimator is stable. In at least some embodiments, the stability of that bias estimator may be evaluated relative to the stability of other bias estimators and/or to the stability of the least squares fit model. The stability may be based on the number of gyroscope readings represented by such bias estimators. For example, in some embodiments, the electronic device 201 may determine whether the bias estimator associated with the temperature is more stable than the least squares fit model by comparing the number of gyroscope readings represented by the bias estimator associated with the temperature to a fraction of the number of gyroscope readings represented by the bias estimators used to generate the least squares fit model. In at least some embodiments, if the bias estimator associated with the temperature represented by the temperature reading obtained at 352 is determined to be stable and/or if it is determined to be more stable than the least squares fit model, then the bias may be determined directly from the bias estimator associated with the temperature represented by the temperature reading obtained at 352. If, however, the bias estimator associated with the temperature represented by the temperature reading obtained at 352 is determined to not be stable and/or if it is determined to be less stable than the least squares fit model, then the bias may be determined using the least squares fit model.

The method described above generally described the determination of a bias for a single axis of a gyroscope. Since the bias may vary for each axis of a gyroscope, the method may be performed independently for each axis of the gyroscope to obtain biases for all axes. That is, a separate set of bias estimators may be maintained for each axis.

Example Bias Estimator Using Histograms

As noted previously, in some embodiments, each bias estimator may use a histogram to determine a bias associated with that bias estimator. In the description that follows, a technique for determining a bias associated with bias estimator will be described. This technique may be used for each of the bias estimators described above to determine a bias associated with that bias estimator.

Figure 4:
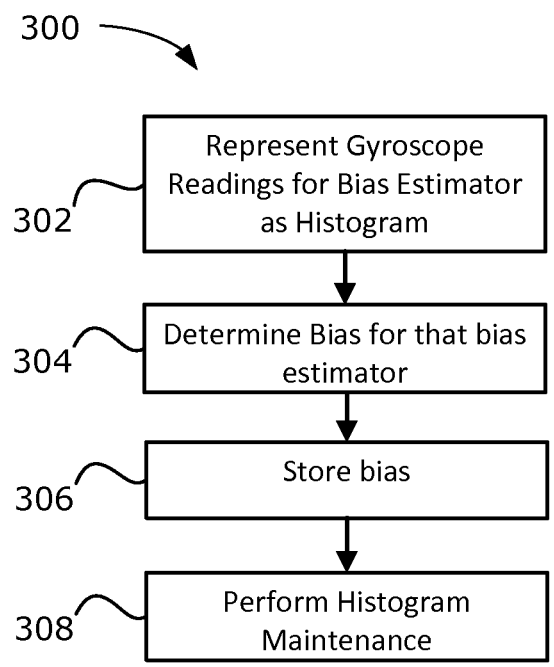
FIG. 4 is a flowchart of an example method for determining a bias for an axis of a gyroscope in accordance with example embodiments of the present disclosure.
Figure 5:
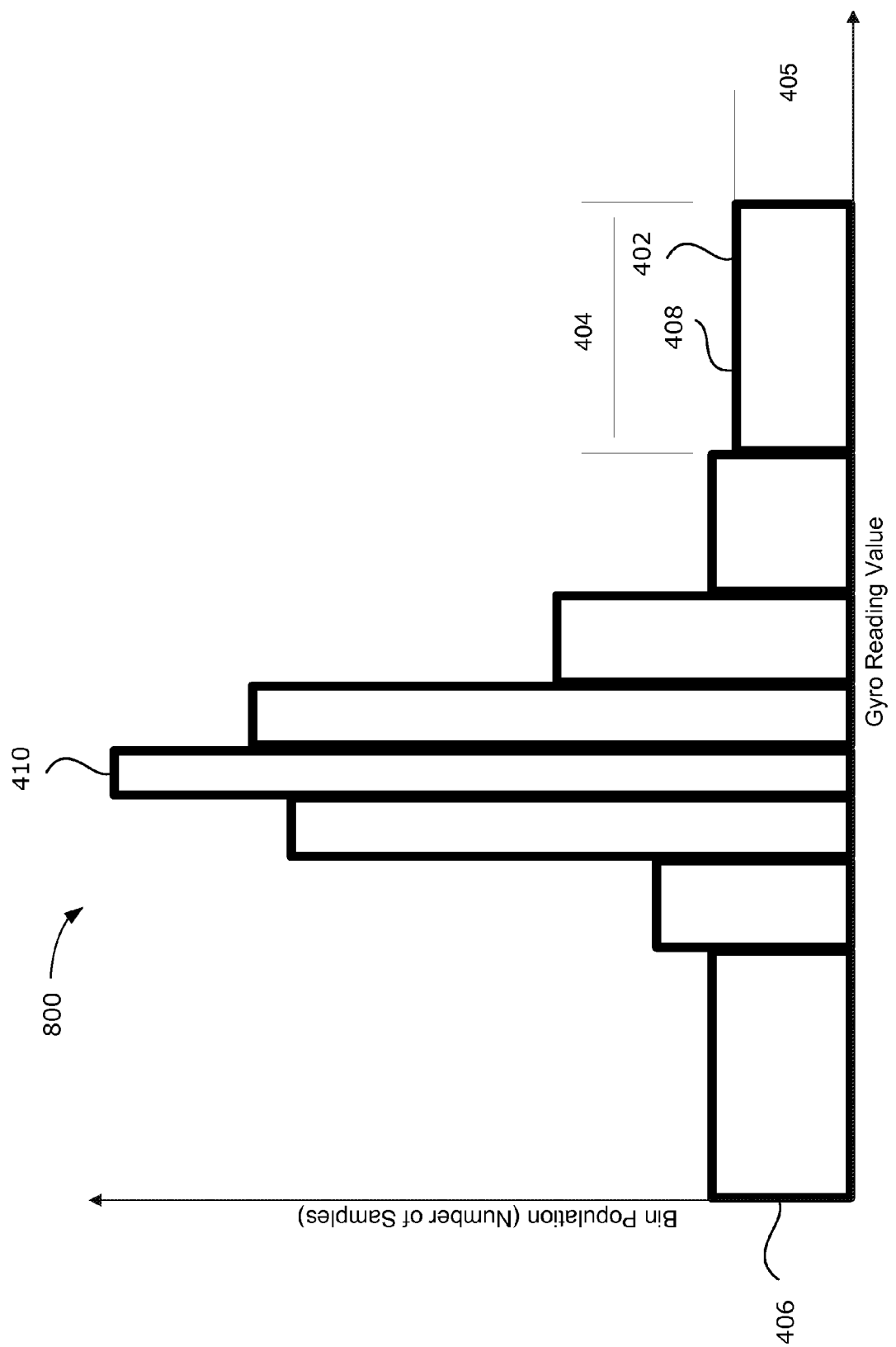
FIG. 5 is an example histogram which may be used to determine a bias of a gyroscope in accordance with example embodiments of the present disclosure.
Figure 6:
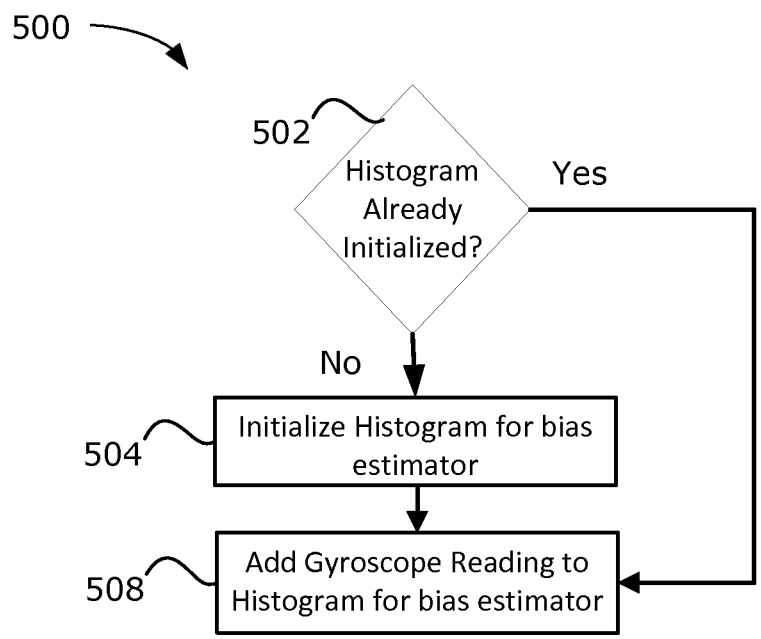
FIG. 6 is a flowchart of an example method for adding a gyroscope reading to a histogram in accordance with example embodiments of the present disclosure.
Figure 7:
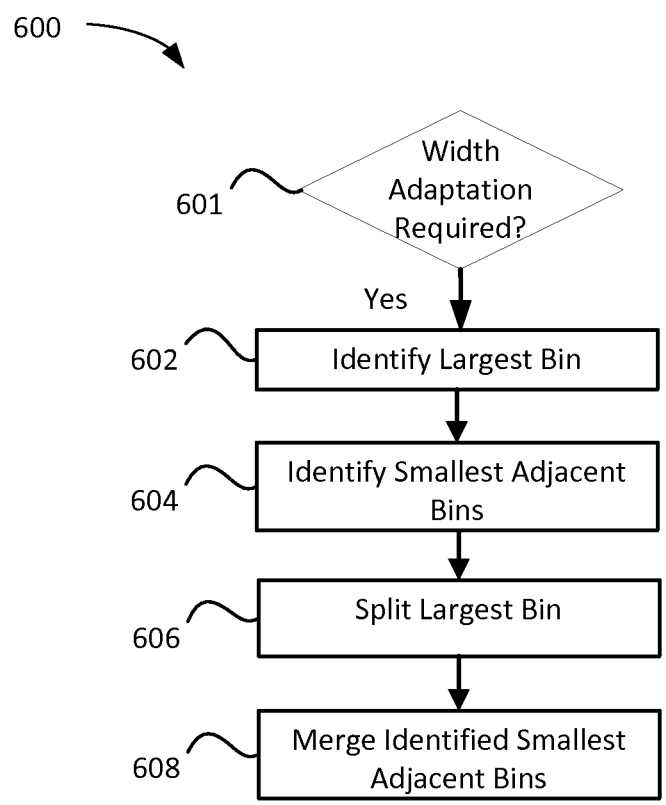
FIG. 7 is an example method of performing bin width reduction in accordance with example embodiments of the present disclosure.

In the description which follows, reference will be made to methods 300, 500, 600 which are illustrated in FIGS. 4, 6 and 7. Any one or more of these methods 300, 500, 600 may include features which may be provided by an electronic device 201, such as the electronic device 201 of FIGS. 1 and 2. For example, one or more applications or modules associated with an electronic device 201, such as the gyroscope calibration application 297 (FIG. 2), may contain processor readable instructions for causing a processor associated with the electronic device 201 to perform one or more operations of the methods 300, 500, 600 of FIGS. 4, 6 and 7. That is, in at least some example embodiments, the electronic device 201 may be configured to perform one or more of the methods 300, 500, 600. For example, one or more of the methods 300, 500, 600 may be implemented by a processor 240 (FIG. 2) of an electronic device 201 (FIG. 2).

In at least some embodiments, one or more of the functions or features of one or more of the methods 300, 500, 600 may be performed, in whole or in part, by another system, software application, module, component or device apart from those specifically listed above. For example, in some embodiments, one or more of the methods 300, 500, 600 may be performed by a processor associated with the gyroscope 108. That is, in at least some embodiments, one or more of the methods 300, 500, 600 or a portion thereof may be performed by a processor other than the main processor the electronic device 201. A processor which is associated with the gyroscope 108 and which may be used for the specific purpose of controlling the gyroscope 108 (i.e. a gyroscope-specific processor) may be configured to perform one or more of the methods 300, 500, 600 or a portion thereof.

Referring first to FIG. 4, at 302, the electronic device 201 represents a plurality of gyroscope readings for an axis of the gyroscope 108 in a histogram 800. These gyroscope readings may include the reading obtained at 354 of FIG. 3.

An example histogram 800 will be described below with reference to FIG. 5. As will be described in greater detail below with reference to FIG. 5, the histogram includes a plurality of bins that are associated with respective ranges. That is, each bin has a range which is associated with that bin. The range of the bin defines gyroscope readings which are considered to be included within that bin. That is, the ranges of the bins define boundaries which are used to separate gyroscope readings into the bins.

Accordingly, at 302, the electronic device 201 effectively builds a histogram 800 which includes past gyroscope readings for the bias estimator. The histogram 800 represents the number of times a gyroscope reading was within each of the ranges of the bins of the histogram 800. That is, the histogram 800 is used to track past gyroscope readings in to allow for easy identification of highly concentrated gyroscope reading values.

The histogram 800 which is generated at 302 may have a small number of bins. For example, in some embodiments, the number of bins is less than twenty. In some embodiments, the number of bins is less than ten. In some embodiments, the histogram 800 includes eight bins. A small number of bins may allow gyroscope readings to be assigned to a bin rapidly and may allow for easier evaluation of bins when determining the bias from the histogram 800.

An example method for adding a gyroscope reading for an axis to a histogram will be described in greater detail below with reference to FIG. 6. That is, a method 500 of generating a histogram based on gyroscope readings will be described in greater detail below.

At 304, the bias is determined for the bias estimator associated with the histogram 800 obtained at 302. The bias is determined by identifying a concentration of the gyroscope readings within the histogram 800. That is, the bias is determined by looking for an area of the histogram 800 where there are a large number of gyroscope readings within a small range.

In at least some embodiments, the bias may be determined, at 304, based on bin populations of the bins. The bin population for a bin identifies a total number of gyroscope readings associated with that bin. The bias may, in at least some embodiments, also be determined based on bin widths for the bins.

For example, in some embodiments, the electronic device 201 may, at 304, identify a most significant bin 410 (FIG. 5) for the histogram 800. The most significant bin is identified based on the bin population for the bins and the width for the bins. For example, in some embodiments, the gyroscope calibration application 297 may determine the most significant bin by calculating a bin significance score for each of the bins. The bin significance score for a bin may be calculated by dividing the bin population for the bin by the width of the bin. Accordingly, the bin significance score varies directly with the bin population and inversely with the width of the bin. The bin having the highest bin significance score may be selected as the most significant bin.

After identifying the most significant bin, the electronic device 201 may determine the bias for an axis of the gyroscope 108 based on the identified most significant bin. For example, the electronic device 201 may determine the bias for the gyroscope 108 by averaging the gyroscope readings in the most significant bin. That is, the bias may be determined as the average of the values of the gyroscope readings which were included in the most significant bin.

In at least some embodiments, at 306, after the bias is determined, the bias may be stored in memory of the electronic device 201.

In some embodiments, at 308, the electronic device may perform histogram maintenance on the histogram. That is, at 308, one or more maintenance operations may be performed on the histogram 800. The maintenance operations may be used to improve the efficiency of the histogram 800. That is, the maintenance operations may be used to improve the speed at which the histogram 800 may be used to identify a bias, and/or the accuracy of the bias which is identified.

In at least some embodiments, at 308, the electronic device 201 may improve precision in concentrated areas of the histogram 800 by adapting bin widths. In at least some embodiments, at 308, the electronic device 201 may reduce the size of the histogram 800.

In at least some embodiments, the method 300 may be repeated. That is, the method 300 may be performed multiple times in order to ensure that the determined bias remains accurate. Since the bias of a gyroscope 108 tends to vary over time, the method 300 may be repeated to ensure that such changes are reflected in the determined bias. That is, the method 300 may be repeated to ensure that the electronic device 201 continues to have a current estimate of the bias. In at least some embodiments, the method 300 may be continually repeated. For example, the method 300 may, upon completing, resume operation again at 302.

Example Histogram

Referring now to FIG. 5, at example histogram 800 is illustrated. The example histogram 800 includes a plurality of bins 402. For the sake of clarity, only a single bin has been labelled.

The example histogram 800 illustrates the bin population of each bin (illustrated on the y-axis). For the sake of clarity, only a single bin population 405 has been labelled. Each bin 402, has an associated bin population 405. The bin population 405 is a measure of the number of gyroscope readings which were included in the bin 402. That is, the bin population 405 illustrates the number of samples which were considered to fall within the bin 402.

In the example histogram 800, the x-axis has been used to represent gyroscope reading values which are considered to be associated with that bin. That is, the x-axis of the histogram 800 effectively illustrates the range of each bin 402. It will be appreciated that, in other examples, the histogram 800 may be represented so that the x-axis represents a bin number instead of the range of gyroscope reading values for the bin.

Each bin 402 has an associated bin width 404 (only one of which has been labelled). The bin width 404 is defined by the range of the bin. That is, the bin width 404 is the difference between an upper limit for gyroscope readings which are considered to be associated with the bin 402 and a lower limit for gyroscope readings which are considered to be associated with the bin 402.

Two bins may be considered to be extreme bins 406, 408. The extreme bins 406, 408 are the bins which are at the outside of the histogram 800. The extreme bins include a lower extreme bin 406 and an upper extreme bin 408. The extreme bins 406 and 408 effectively define the range of the histogram 800. A lower limit of the range of the lower extreme bin 406 defines a lower limit associated with the histogram 800 and an upper limit of the range of the upper extreme bin 408 defines an upper limit associated with the histogram 800.

One of the bins may be considered to be a most significant bin 410. The most significant bin 410 identifies a point of concentration in the histogram 800. That is, the most significant bin 410 is a bin 402 having the best combination of bin width and bin population. Methods of identifying which bin 402 is the most significant bin 410 are described in greater detail with reference to FIG. 4.

Obtaining Histogram

Referring now to FIG. 6, a method 500 for obtaining a histogram 800 is illustrated in flowchart form. The method 500 may, for example, be performed at 302 of the method of FIG. 4.

At 502, the electronic device 201 may, in some embodiments, determine whether the histogram 800 is already initialized. For example, the electronic device 201 may determine whether the memory of the electronic device 201 already includes the histogram 800 or whether a new histogram 800 must be created.

If the histogram 800 is not already initialized then, at 504, the histogram 800 may be initialized. In at least some embodiments, the histogram 800 may be initialized by storing, in memory, a histogram 800 having one or more default properties. For example, the histogram 800 may have a default number of bins, each having default ranges. In at least some embodiments, the histogram 800 may be created so that all bins 402 initially have the same bin width 404. The bin population 405 for the bins 402 of the newly created histogram 800 may initially be nil.

After a histogram 800 is initialized (i.e. after a new histogram is initialized at 504 or if it is determined at 502 that a histogram is already initialized), then at 508, the gyroscope reading (which may have been obtained at 354 of FIG. 3) may be added to the histogram 800. That is, the histogram 800 may be updated to reflect the additional gyroscope reading. More particularly, the electronic device 201 may use the ranges associated with the bins of the histogram 800 to assign the gyroscope reading to a specific one of the bins 402. That is, an appropriate bin for the gyroscope reading is identified based on the ranges of the bins 402. A bin population 405 for identified bin may be updated to reflect the fact that the bin 402 has a new bin member.

In some embodiments, a sum of gyroscope readings within each bin 402 may be maintained by the electronic device 201. For example, rather than track all of the individual gyroscope readings associated with a bin 402, the electronic device 201 may instead maintain a sum of the gyroscope readings which were associated with that bin 402. The sum of the readings, when coupled with the bin population 405 allows an average gyroscope reading for a bin to be determined. As noted in the discussion of 304 of the method 300 of FIG. 4 above, the average gyroscope reading for the most significant bin 410 may provide the bias.

In some embodiments and in some situations, a gyroscope reading may be obtained which falls outside of the range of the histogram 800. In some such embodiments, the reading may be ignored. In other embodiments, if a gyroscope reading is outside of a range of the histogram, the electronic device 201 may automatically increase the range of one of the extreme bins 406, 408 of the histogram so that the gyroscope reading may be included in that bin.

The method 500 of FIG. 6 may be repeatedly performed in order to provide a well-populated histogram 800 which yields an accurate estimate of bias.

Adapting Bin Widths

Referring now to FIG. 7, a method 600 of adapting bin widths 404 of a histogram 800 is illustrated in flowchart form. The method 600 may, for example, be performed at 308 of the method 300 of FIG. 4. The bin adaptation is performed to maintain the histogram so that the histogram may easily identify areas of concentration.

At 601, the electronic device 201 determines whether width adaptation is required. The electronic device 201 may make this determination based on one or more predetermined criteria. The predetermined criteria may consider, for example, the bin population of the bin having the largest bin population. The predetermined criteria may also consider, for example, the sum of the bin populations for a pair of adjacent bins of the histogram which collectively contain fewer gyroscope readings than any other pair of adjacent bins. For example, in some embodiments, the electronic device 201 may determine the ratio of the bin population of the bin having the largest bin population to the sum of the bin populations for the pair of adjacent bins which collectively contain fewer gyroscope readings than any other pair of adjacent bins. If this ratio exceeds a threshold, then the electronic device 201 may determine that bin width adaptation is required.

If bin adaptation is required, then at 602, the electronic device 201 may identify the bin 402 of the histogram 800 containing the greatest number of gyroscope readings and may, at 604, identify the pair of adjacent bins of the histogram 800 which collectively contain fewer gyroscope readings than any other pair of adjacent bins.

At 606, the electronic device 201 may split the largest bin into two bins. That is, the electronic device may form two bins from the single largest bin. The bin width of each of the newly formed bins may be half the bin width of the largest bin. In some embodiments, the bin population of each of the newly formed bins is half the bin population of the largest bin. Similarly, if the electronic device 201 maintains a sum of gyroscope readings associated with each bin, then the sums for the new bins may be half of the sum from the largest bin.

At 608, the electronic device 201 may merge the pair of adjacent bins identified at 604. That is, the electronic device 201 may combine these two bins so that these two bins now become one bin. The bin width of the newly formed bin may be the sum of the bin widths of both bins in the pair. Similarly, the bin population of the newly formed bin may be the sum of the bin populations for both bins in the pair. The sum of gyroscope readings associated with the newly formed bin may be the sum of the gyroscope readings for both bins in the pair.

In at least some embodiments, the method 600 maintains the number of bins in the histogram at a constant number. That is, the number of bins in the histogram 800 is the same before the method 600 is performed as it is after the method 600 is performed. While the ranges of individual bins may be affected, the number of bins is static.

The method 600 eventually causes the bin with the most gyroscope readings to continually split and increase its resolution. Accordingly, the bin which contains the bias (and which contains a high concentration of measurements) will eventually become very precise. Furthermore, the splitting allows slow changing bias signals to be tracked because, after the bin with the bias is split, one of the two sides of that bin will typically take the new gyroscope readings representing the bias.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable storage medium including program instructions recorded thereon (which may, for example, cause a processor to perform one or more of the methods described herein), or a computer data signal carrying computer readable program instructions may direct an apparatus to facilitate the practice of the described methods. It is understood that such apparatus, articles of manufacture, and computer data signals also come within the scope of the present disclosure.

The term "computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile/Video Disc (DVD) or Blu-Ray™ Disc, and a solid state storage device (e.g., NAND flash or synchronous dynamic RAM (SDRAM)).

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A processor-implemented method of determining a bias for an axis of a gyroscope, the method comprising:
   obtaining a temperature reading from a temperature sensor;
   maintaining a plurality of bias estimators for the axis, each bias estimator associated with a temperature and configured to estimate a bias at the associated temperature, the plurality of bias estimators including a predetermined number of short term bias estimators for estimating biases for recently obtained temperatures and a number of long term bias estimators for estimating biases for temperatures obtained over a comparatively longer period of time;
   determining a bias for the axis of the gyroscope based on the temperature reading and one or more of the bias estimators; and
   correcting a gyroscope reading based on the bias,
   wherein maintaining the plurality of bias estimators comprises:
   determining that the temperature reading defines a temperature that does not have a bias estimator associated therewith; and
   in response to determining that the temperature reading defines a temperature that does not have a bias estimator associated therewith, replacing one of the short term bias estimators associated with a temperature with a new short term bias estimator associated with a different temperature such that the predetermined number of short term bias estimators is maintained, the different temperature defined by the temperature reading.

2. The method of claim 1, wherein determining a bias for the axis of the gyroscope based on the temperature readings and one or more of the bias estimators comprises:
   when the bias estimators are not associated with the temperature represented by the temperature reading, then determining the bias by performing a least squares fit using a plurality of the bias estimators and the temperatures associated with those bias estimators.

3. The method of claim 2, wherein determining a bias for the axis of the gyroscope based on the temperature readings and one or more of the bias estimators comprises:
   when one of the bias estimators is associated with the temperature represented by the temperature reading, determining the bias using the bias estimator associated with the temperature represented by the temperature reading.

4. The method of claim 1, further comprising:
   maintaining a temperature independent bias estimator, the temperature independent bias estimator providing a bias estimate for the axis of the gyroscope across all obtained temperatures; and
   when the bias estimators that are associated with temperatures are not reliable, determining the bias using the temperature independent bias estimator.

5. The method of claim 1, wherein maintaining a plurality of bias estimators for the axis comprises:
   storing the short term bias estimators in a least recently used cache.

6. The method of claim 1, wherein replacing one of the short term bias estimators with a bias estimator for the different temperature comprises:
   discarding the least recently used short term bias estimator; and
   storing the new short term bias estimator based on gyroscope readings obtained at the temperature defined by the temperature reading.

7. The method of claim 1, wherein replacing one of the short term bias estimators comprises:
   determining if the least recently used short term bias estimator contains too few gyroscope readings to be considered for inclusion as a long term bias estimator by comparing a number of gyroscope readings represented by the least recently used short term bias estimator to a predetermined threshold,
   and:
      when the least recently used short term bias estimator contains too few gyroscope readings to be considered for inclusion as a long term bias estimator, discarding the least recently used short term bias estimator; and
      storing a new short term bias estimator based on a gyroscope reading obtained at the temperature defined by the temperature reading.

8. The method of claim 1, further comprising:
   replacing one of the long term bias estimators with the least recently used short term bias estimator,
   and wherein replacing one of the short term bias estimators comprises:
      storing a new short term bias estimator based on a gyroscope reading obtained at the temperature defined by the temperature reading.

9. The method of claim 1, wherein replacing one of the short term bias estimators comprises:
   selecting one of the long term bias estimators for replacement by:
      identifying a range of temperatures represented by the bias estimators;
      based on the identified range of temperatures, selectively protecting one or more of the long term bias estimators from replacement; and
      selecting one of the long term bias estimators that is not protected for possible replacement.

10. The method of claim 9, wherein selectively protecting one or more of the long term bias estimators from replacement comprises:
 separating the range of temperatures represented by the bias estimators into a plurality of sub-ranges; and
 for each sub-range that does not include the temperature associated with the least recently used short-term bias estimator, protecting, from replacement, one of the long term bias estimators having a temperature included in that sub-range.

11. The method of claim 10, wherein protecting, from replacement, one of the long term bias estimators having a temperature included in that sub-range comprises:
 identifying the long term bias estimator representing the greatest number of gyroscope readings in that sub-range; and
 protecting the identified long term bias estimator from being replaced.

12. The method of claim 1, wherein maintaining a plurality of bias estimators for the axis comprises:
 periodically reducing the number of gyroscope readings represented by the long term bias estimators.

13. The method of claim 1, wherein at least one of the bias estimators comprises a histogram.

14. The method of claim 1 further comprising:
 determining whether one of the long term bias estimators will be replaced with the least recently used short term bias estimator by comparing the number of gyroscope readings represented by the least recently used short term bias estimator with the number of gyroscope readings represented by one or more of the long term bias estimators.

15. An electronic device configured for determining a bias for an axis of a gyroscope, the electronic device comprising:
 a memory for storing a plurality of bias estimators for the axis, each bias estimator associated with a temperature and configured to estimate a bias at the associated temperature, the plurality of bias estimators including a predetermined number of short term bias estimators for estimating biases for recently obtained temperatures and a number of long term bias estimators for estimating biases for temperatures obtained over a comparatively longer period of time;
 the gyroscope;
 a temperature sensor; and
 a processor coupled to the memory, the gyroscope, and the temperature sensor, the processor being configured to:
  obtain a temperature reading from a temperature sensor;
  maintain the plurality of bias estimators for the axis;
  determine a bias for the axis of the gyroscope based on the temperature reading and one or more of the bias estimators; and
  correct a gyroscope reading based on the bias,
 wherein maintaining the plurality of bias estimators comprises:
  determining that the temperature reading defines a temperature that does not have a bias estimator associated therewith; and
  in response to determining that the temperature reading defines a temperature that does not have a bias estimator associated therewith, replacing one of the short term bias estimators associated with a temperature with a new short term bias estimator associated with a different temperature such that the predetermined number of short term bias estimators is maintained, the different temperature defined by the temperature reading.

16. The electronic device of claim 15, wherein determining a bias for the axis of the gyroscope based on the temperature readings and one or more of the bias estimators comprises:
 when the bias estimators are not associated with the temperature represented by the temperature reading, then determining the bias by performing a least squares fit using a plurality of the bias estimators and the temperatures associated with those bias estimators.

17. The electronic device of claim 16, wherein determining a bias for the axis of the gyroscope based on the temperature readings and one or more of the bias estimators comprises:
 when one of the bias estimators is associated with the temperature represented by the temperature reading, determining the bias using the bias estimator associated with the temperature represented by the temperature reading.

18. The electronic device of claim 15, wherein the processor is further configured to:
 maintain a temperature independent bias estimator, the temperature independent bias estimator providing a bias estimate for the axis of the gyroscope across all obtained temperatures; and
 when the bias estimators that are associated with temperatures are not reliable, determine the bias using the temperature independent bias estimator.

19. The electronic device of claim 15, wherein maintaining a plurality of bias estimators for the axis comprises:
 storing the short term bias estimators as a least recently used cache in the memory.

20. The electronic device of claim 15, wherein replacing one of the short term bias estimators with a bias estimator for the different temperature comprises:
 discarding the least recently used short term bias estimator; and
 storing the new short term bias estimator based on gyroscope readings obtained at the different temperature.

21. The electronic device of claim 15, wherein replacing one of the short term bias estimators comprises:
 determining if the least recently used short term bias estimator contains too few gyroscope readings to be considered for inclusion as a long term bias estimator by comparing a number of gyroscope readings represented by the least recently used short term bias estimator to a predetermined threshold,
 and:
  when the least recently used short term bias estimator contains too few gyroscope readings to be considered for inclusion as a long term bias estimator, discarding the least recently used short term bias estimator; and
  storing a new short term bias estimator based on a gyroscope reading obtained at the different temperature.

22. A non-transitory computer readable storage medium comprising computer-executable instructions for determining a bias for an axis of a gyroscope, the computer-executable instructions including:
 instructions for obtaining a temperature reading from a temperature sensor;
 instructions for maintaining a plurality of bias estimators for the axis, each bias estimator associated with a temperature and configured to estimate a bias at the associated temperature, the plurality of bias estimators including a predetermined number of short term bias estimators for estimating biases for recently obtained temperatures and a number of long term bias estimators for estimating biases for temperatures obtained over a comparatively longer period of time; and instructions for determining a bias for the axis of the gyroscope based on the temperature reading and one or more of the bias estimators; and instructions for correcting a gyroscope reading based on the bias, wherein maintaining the plurality of bias estimators comprises:

determining that the temperature reading defines a temperature that does not have a bias estimator associated therewith; and in response to determining that the temperature reading defines a temperature that does not have a bias estimator associated therewith, replacing one of the short term bias estimators associated with a temperature with a new short term bias estimator associated with a different temperature such that the predetermined number of short term bias estimators is maintained, the different temperature defined by the temperature reading.

* * * * *